March 22, 1932.  A. B. MERRILL  1,850,683
SHAFT SLEEVE
Filed Feb. 1, 1929
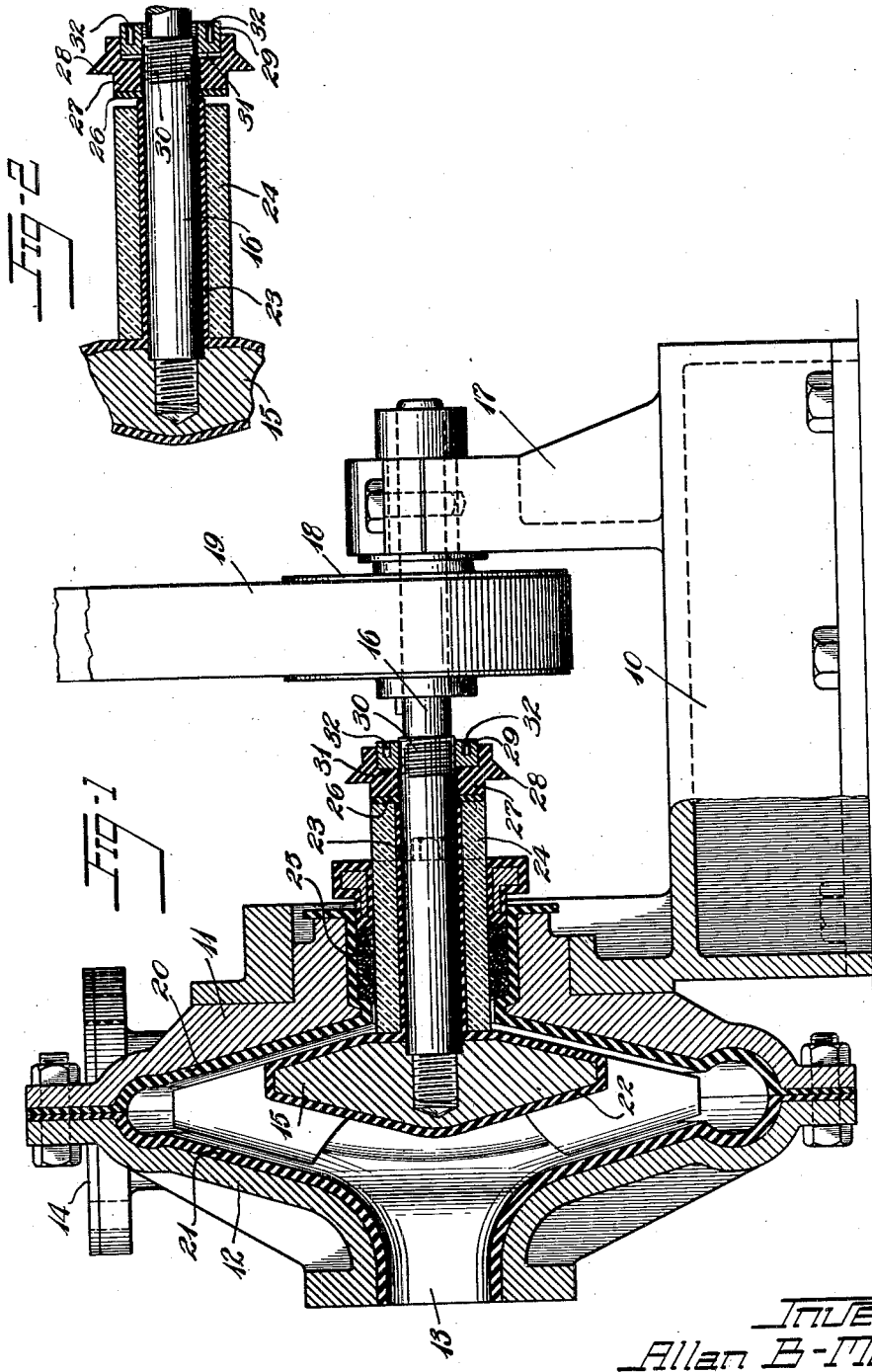
Inventor
Allan B. Merrill
By Eakin & Avery
Attys.

Patented Mar. 22, 1932

1,850,683

UNITED STATES PATENT OFFICE

ALLAN B. MERRILL, OF AKRON, OHIO, ASSIGNOR TO THE B. F. GOODRICH COMPANY, OF NEW YORK, N. Y., A CORPORATION OF NEW YORK

SHAFT SLEEVE

Application filed February 1, 1929. Serial No. 336,783.

This invention relates to shaft-sleeves, and especially to corrosion-resisting sleeves such as are used, for example, upon the drive shafts of certain centrifugal pumps employed for impelling corrosive fluids.

As usually employed for the purpose mentioned, the sleeve is composed of ceramic material such as porcelain, and is mounted upon the shaft where the latter passes through the stuffing box, a lining of hard rubber being provided for the sleeve, said lining being keyed or otherwise secured to the shaft so that the shaft, lining and sleeve rotate together. This construction requires that the sleeve-lining engage the sleeve with a tight fit, or be adhered thereto, so the sleeve and lining will rotate as a unit. The sleeve is subject to frequent breakage due to different co-efficients of expansion of the associated parts when frictional heat is developed while the shaft is rotating.

The chief object of my invention is to provide an improved shaft, sleeve and lining assembly which will be simpler in construction and more economical in use than similar structures heretofore used. More specifically, I aim to avoid the necessity of keying the sleeve-lining to the shaft; positively to prevent corrosive fluid from reaching the shaft; to avoid the necessity of nice interfitting of the respective parts of the device; and, in a large measure, to avoid frequent breakage of the sleeve member as the result of unequal heat-expansion or contraction of the associated parts.

Of the accompanying drawings:

Fig. 1 is an elevation of a rubber lined centrifugal pump and its associated drive mechanism, embodying my invention in its preferred form, some of the parts being shown in vertical section.

Fig. 2 is a fragmentary sectional detail of the shaft-sleeve and associated parts, showing the sleeve-lining in its natural condition.

Referring to the drawings, 10 is the base, 11 is the casing, and 12 is the cover of a centrifugal pump of known general construction, and 13, 14 respectively are the inlet and outlet ports thereof. The pump is provided with the usual rotary impeller 15, which is mounted upon the inner end of a shaft 16 having its outer end portion journaled in a bearing bracket 17 rising from the base 10, said shaft also being provided with a drive-pulley 18 driven by a belt 19 from a suitable source of power (not shown). The casing 11 and cover 12 are provided with respective linings 20, 21 as shown, of corrosion and abrasion resisting material such as soft rubber, and the impeller 15 is provided with a protective covering 22 of like material.

The rubber covering 22 of the impeller 15 is vulcanized to the latter and is integrally formed with a tubular sleeve portion 23 extending onto and surrounding the adjacent portion of the shaft 16, and preferably vulcanized thereto. Mounted upon the shaft 16, over the rubber sleeve portion 23, is a sleeve 24 of ceramic material, preferably material having a low coefficient of thermal expansion, such as the boro-silicate glass known by the trade-name of "Pyrex". The ceramic sleeve 24 is so constructed as normally to slide easily over the rubber sleeve 23, and is of such length that a small portion of the latter extends beyond the outer end of the sleeve 24 when the inner end of the sleeve 24 abuts the rubber covering 22 of the impeller, as is clearly shown in Fig. 2. The outer face of the sleeve 24 is engaged by the packing 25 of a rubber-lined stuffing box mounted in the casing 11.

A resilient rubber washer 26 is mounted upon the shaft 16 at the outer end of the rubber sleeve 23, and a thrower ring 27 formed with a tapered radial flange 28 is mounted upon said shaft behind said washer. A nut 29, mounted upon a threaded portion 30 of the shaft 16, and fitting within a counterbore 31 in the rear face of the thrower ring 27, is formed with recesses 32, 32 by which it may be engaged by a suitable spanner wrench to move the nut axially of the shaft 16 and thereby to urge the washer 26 first against the adjacent end of the rubber sleeve 23 and then against the end of the ceramic sleeve 24.

The arrangement is such that when the washer 26 is forced against the end of the rubber sleeve 23 by the tightening of the nut 29, the material of the rubber sleeve is displaced and distended radially outward against the inner wall of the ceramic sleeve 24, and engages the latter with sufficient pressure to assure adequate driving friction between the rubber and ceramic sleeves. Further axial movement of the washer 26 brings it to bear against the adjacent end face of the ceramic sleeve 24 and presses the opposite end of the latter against the rubber covering 22 of the impeller 15, thus augmenting the frictional engagement of the ceramic sleeve 24 with the shaft assembly.

The invention provides an improved shaft-sleeve which is but little affected by temperature changes, as the sleeve 23 provides a cushion between the sleeve 24 and the shaft 16 so that expansion and contraction of the latter due to temperature changes is not communicated directly to the ceramic sleeve, but is largely absorbed in the resilient sleeve 23.

The resilient sleeve 23 being integral with the covering 22 of the impeller 15, corrosive fluid is positively prevented from reaching the shaft 16 at their juncture, and is prevented from passing between the sleeves 23, 24 by the tight fit with which the distended resilient sleeve 23 engages the ceramic sleeve 24.

My invention is susceptible of modification within the scope of the appended claims.

I claim:

1. In a device of the character described, the combination of a rotatable shaft, a ceramic sleeve thereon adapted to provide a corrosion-resistant bearing surface, and a cushion of deformable material between said sleeve and said shaft adapted to hold the sleeve and shaft in proper relation and protect the shaft from corrosive liquids.

2. A device as defined in claim 1, including means for deforming the deformable cushion to effect radial distention thereof.

3. In a device of the character described, the combination of a rotatable shaft, a deformable sleeve mounted on said shaft and adapted to protect the shaft against corrosion, a ceramic sleeve mounted upon said deformable sleeve and adapted to provide a corrosion-resistant bearing surface thereon, and means for deforming the deformable sleeve to effect radial distention thereof so that it forcibly engages the ceramic sleeve.

4. A device as defined in claim 3, in which the sleeve-deforming means comprises a member movable axially of the shaft to exert pressure against one end of the deformable sleeve.

5. In a device of the character described, the combination of a rotatable shaft, a deformable sleeve mounted thereon, a ceramic sleeve mounted upon said deformable sleeve in a manner to expose a projecting end portion of the latter, and means for engaging the projecting portion of the deformable sleeve and for exerting an axially directed compressive force thereagainst to effect radial distention of the mass of the sleeve.

6. A device as defined in claim 5, in which the sleeve-deforming means includes a rubber washer so arranged as to engage the end of the ceramic sleeve after the deformable sleeve has been compressed.

7. A shaft-sleeve composed of borosilicate glass having a low coefficient of thermal expansion, a rotatable shaft for supporting the same, and a cushion of deformable material between said sleeve and said shaft.

8. The combination comprising a shaft-sleeve composed of glass, a rubber lining therefor of greater length than said sleeve so that it projects therefrom, a shaft on which said sleeve and its lining are mounted, and means for exerting a compressive force on the projecting portion of the sleeve-lining to effect displacement of the mass of the lining whereby the sleeve and shaft are restrained against angular movement with relation to each other.

9. The combination comprising a rotatable shaft, a cylindrical bearing sleeve of corrosion-resistive, frangible material surrounding the shaft and spaced therefrom, and means carried by the shaft including a deformable soft rubber member for clamping the sleeve in non-rotative relation thereto and sealing the shaft from contact with corrosive liquids.

In witness whereof I have hereunto set my hand this 30th day of January, 1929.

ALLAN B. MERRILL.